United States Patent [19]
Ostebee et al.

[11] 3,917,315
[45] Nov. 4, 1975

[54] SAFETY HITCH

[76] Inventors: Loren C. Ostebee; Lowell I. Howe, both of Rte. No. 1, Kirkman, Iowa 51447

[22] Filed: Sept. 13, 1974

[21] Appl. No.: 505,837

[52] U.S. Cl. ............................. 280/457; 280/457
[51] Int. Cl.[2] ........................................ B60D 1/12
[58] Field of Search ................................... 280/457

[56] References Cited
UNITED STATES PATENTS

| | | | |
|---|---|---|---|
| 2,053,255 | 9/1936 | Ferguson et al. | 280/457 |
| 2,251,656 | 8/1941 | Botelho | 280/457 |
| 2,650,101 | 8/1953 | Frankfother | 280/457 |

FOREIGN PATENTS OR APPLICATIONS

| | | | |
|---|---|---|---|
| 560,939 | 4/1957 | Italy | 280/457 |

*Primary Examiner*—Leo Friaglia
*Attorney, Agent, or Firm*—Henderson & Strom

[57] ABSTRACT

A safety hitch for a trailer or the like which replaces the conventional safety chains of a trailer hitch. A conventional tongue member is adapted to be connected to a trailing vehicle and has a conventional connecting structure on one end thereof such as a hole for reception of a pin or other conventional structure such as that used for ordinary ball-type hitches. An abutment member is spaced upwardly from but is attached to the tongue member. A rigid safety member is pivotally attached to the tongue member through a lever mechanism and horizontally disposed pivotal points. The safety member extends under the abutment member and between the abutment member and the tongue member. The other end of the of the safety member is attached through a vertical pivot, which is located directly above the vertical pivot of the tongue member. Additionally, a horizontal pivot is disposed on the other end of the safety member adjacent the vertical pivot. The safety member and its associated structure does not interfere with the ordinary function of an ordinary trailer hitch apparatus, and it furthermore allows the pulling vehicle to maintain control of the trailing vehicle even if the primary and conventional hitch mechanism becomes unfastened. This structure prevents the tongue member from digging into the ground as is often the case when conventional safety chains are used.

3 Claims, 7 Drawing Figures

SAFETY HITCH

BACKGROUND OF THE INVENTION

The present invention relates to trailer hitches, and more particularly to a trailer hitch apparatus having an improved safety factor.

There are two types of trailer hitches which are most common. The of these ofthese trailer hitches is merely a plate connected to a pulling vehicle and having a hole therethrough. This hole in the plate is adapted for cooperation with a clevis-like structure attached to the end of a trailing vehicle, whereby a pin is placed through the clevis-like structure and through the opening in the plate of the hitch, whereby a vertical axis pivotal point is formed, but wherein the pivot is loose enough so that a small amount of horizontal pivoting is allowed between the pulling and the trailing vehicles. This type of trailer hitch is a most common hitch for agricultural equipment especially, such as for farm wagons.

Another very common type of trailer hitch is the so called "ball" hitch. The ball hitch is normally used for trailing and pulling vehicles over roads where higher speeds are customary.

When utilizing either of the above hitches it is usual, and depending on the place where used, sometimes mandatory, to use a safety chain or other safety device for connecting the pulling and trailing vehicles together, in case the primary hitch accidently becomes unfastened. One of the problems associated with the conventional safety chain has been that it is normally just hooked to rather than being positively fastened to the pulling vehicle, such that it consequently can come loose quite easily, either before or after the primary hitch inadvertently becomes unfastened.

Another of the problems associated with the conventional and widely used safety chain is that once the primary hitch becomes undone, the looseness of the chain or chains allows the tongue member of the trailing vehicle to fall to the ground and dig the end thereof into the road surface, thereby causing the operator of the pulling vehicle to lose control of the trailing vehicle. Even if the chain is short enough to keep the tongue off of the ground, control through the safety chain alone is very difficult. Furthermore, if the chain is made so that it is short enough to keep the tongue member off of the ground, it will then quite often interfere with the turning of the trailing vehicle under ordinary circumstances when the primary hitch is attached.

SUMMARY OF THE INVENTION

The present invention relates to a safety device for a trailer hitch. A conventional trailing vehicle tongue member having a conventional trailer hitch structure on one end thereof also has a rigid safety member pivotally attached thereto, along a horizontal axis. A structure is provided for connecting the other end of the safety member to a pulling vehicle at a point adjacent to but slightly spaced from the conventional hitch structure. An abutment member is provided for connection to the tongue member and for cooperation with the safety member to thereby prevent the tongue member from touching the ground if the primary hitch inadvertently becomes unfastened. Additionally, this safety structure is provided to permit good control of the trailing vehicle by the operator of the pulling vehicle, despite having a primary hitch which has been accidently unfastened.

An object of the present invention is to provide a safety device for a trailer hitch apparatus which ensures that the tongue member of the trailing vehicle remains off the ground at all times, despite an inadvertent or accidental unfastening of the primary hitch.

A further object of the invention is to replace the conventional safety chain with a device which does not have the lost motion associated with a conventional safety chain.

Still another object of the present invention is to provide an extremely dependable safety back-up device for a trailer hitch which is economical to produce and practical to use.

Other objects, advantages, and novel features of the present invention will become apparent from the following detailed description of the invention when considered in conjunction with the accompanying drawings.

DESCRIPTION OF THE PREFERRED EMBODIMENT

Figure 1:
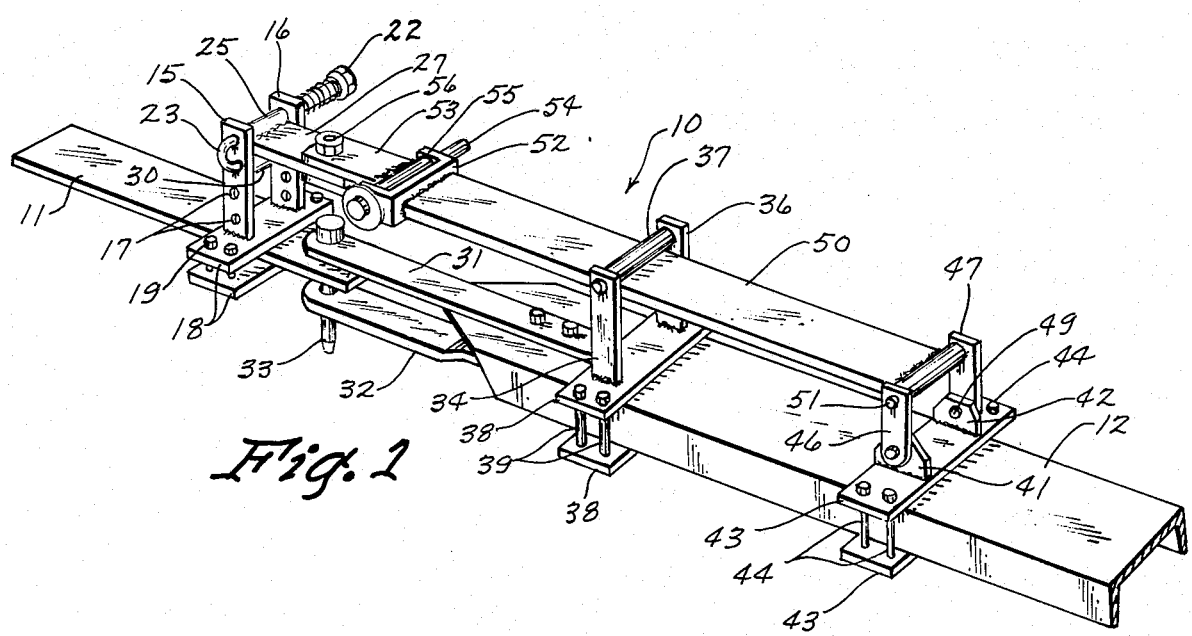
FIG. 1 shows a perspective view of the present invention.
Figure 2:
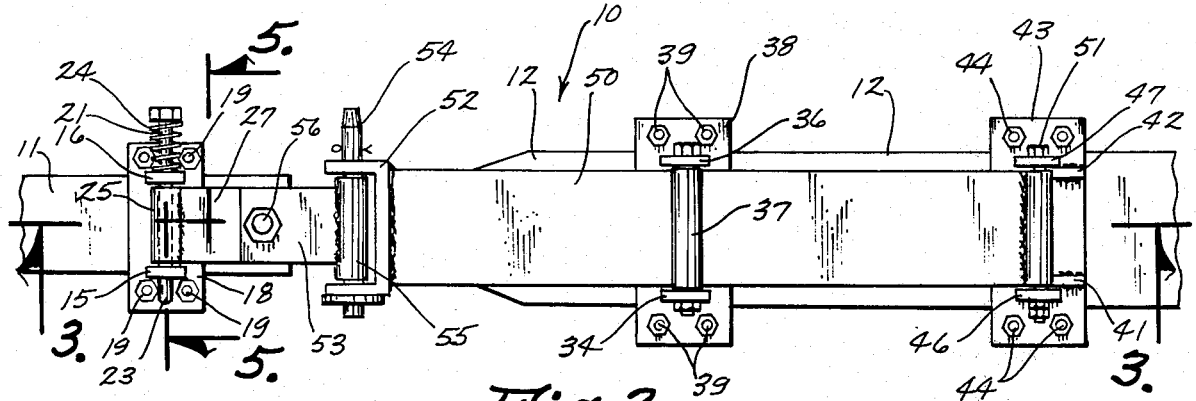
FIG. 2 is a top plan view of the hitch mechanism of the present invention.

Referring now to the drawings, wherein like reference numerals designate identical corresponding parts throughout the several views, FIG. 1 shows the hitch apparatus 10 which would be connected by a plate 11 to a pulling vehicle or prime mover (not shown) at one end thereof and to a trailing vehicle (not shown) through a tongue member 12 at the other end thereof.

The plate 11 corresponds to the conventional trailer hitch mechanism which extends from the rear of a pulling vehicle, such as an automobile, and this plate 11 has an opening 13 in one end thereof for connection to a conventional tongue 12 of a trailer or other trailing vehicle. It is to be understood that this hole 13 may receive a standard ball of a ball-type hitch for mating with a tongue member of a corresponding shape. It will be appreciated by those skilled in this art that other types of primary hitches will also work with this invention, and accordingly this invention is not intended to be limited to the type of primary hitches shown or to the types mentioned herein.

Figures 5, 6:
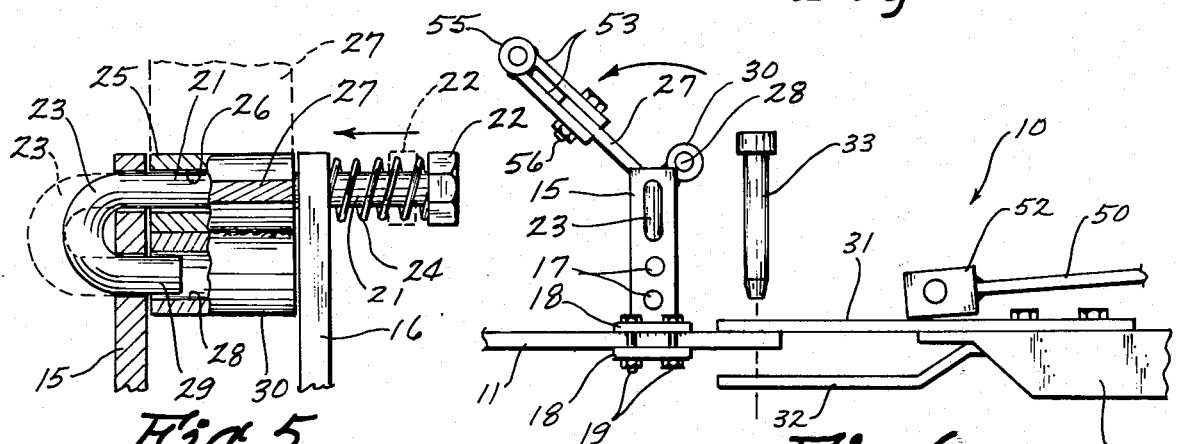
FIG. 5 is a partial cross-sectional view of a portion of the present invention taken along line 5—5 of FIG. 2.
FIG. 6 is a side view of the present invention showing the position of the apparatus needed to allow insertion of a pin for the primary hitch portion of the invention.

Also rigidly attached to the plate 11 are two spaced bars 15 and 16 which have a series of equally spaced openings 17 disposed therein. These bars 15 and 16 are shown as being rigidly affixed to the plate 11 by a clamping device consisting of two plates 18 and four bolts 19. These bars 15 and 16 could merely be welded to the plate 11, if desired. Received within the top hole 17 of the bars 15 and 16 is a rod 21 having an enlarged end 22 on one end thereof, and a semicircular portion 23 on the other end thereof. This rod 21 is biased to the position shown in solid lines in FIG. 5 by means of a coil spring 24, but is movable to the position shown in dashed lines in FIG. 5 by pushing the enlarged head 22 of the rod 21 to the left as shown in FIG. 5 and thereby overcoming a bias of the spring 24. It can also be seen from FIG. 5 that the rod 21 extends through an opening 26 which is formed in a tube 25 attached to one end of the plate 27. Another opening 28 is also formed from a tube 30 and attached to the plate 27. This opening 28 is disposed directly below the opening 26, such that the end part 29 of the semicircular portion 23 of the rod 21 can be selectively received into and out from the opening 28. It can therefore be seen that when the end part 29 of the rod 21 is received within the opening 28, then the plate 27 is locked into a non-rotating position, but when the end part 29 of the rod 21 is removed from the opening 28, then the plate 27 may be pivoted about the rod 21.

Figure 3:
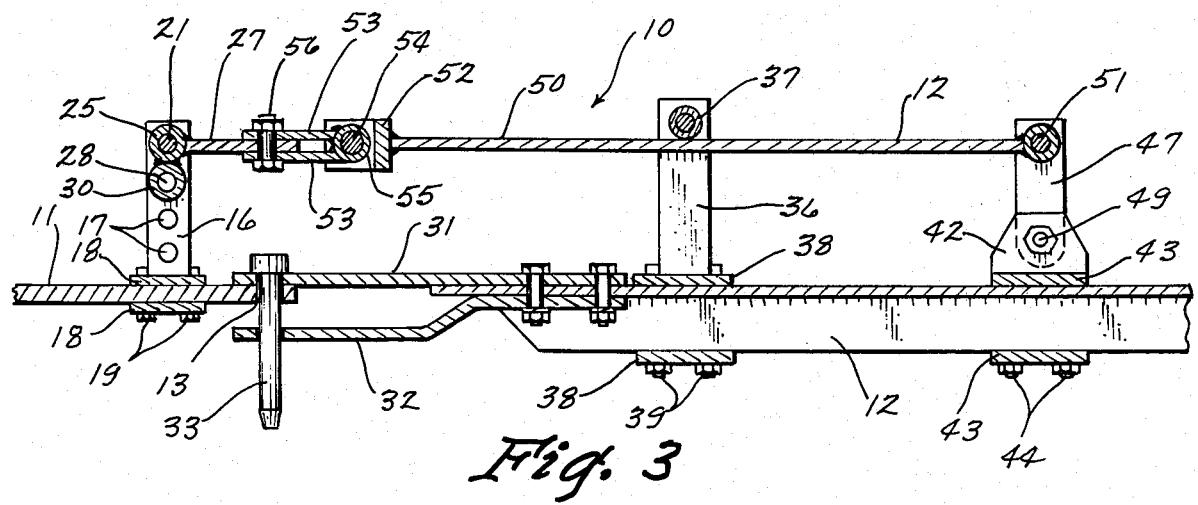
FIG. 3 is a cross-sectional view taken along line 3—3 of FIG. 2.

Rigidly attached to one end of the tongue member 12 are a pair of tongue flanges 31 and 32. These tongue flanges 31 and 32 each have openings in the ends thereof, which are aligned with respect to each other and which can be aligned with the opening 13 in the plate 11 to allow the reception of a pin 33. When this pin 33 is received through the plate 11 and the tongue flange members 31 and 33, as shown in FIGS. 1 and 3 for example, a conventional trailer hitch structure is achieved. Also attached to the tongue member 12 are a pair of spaced rigid bars 34 and 36. A rod 37 connects the tops of the bars 34 and 36. These bars 34 and 36 are rigidly affixed to the tongue member 12 by a clamping apparatus consisting of two plates 38 and four bolts 39, but it is to be understood that other affixing means can be used; for example these bars 34 and 36 could merely be welded to the tongue member 12.

Also extending upwardly from the tongue member 12 are a pair of hinge members 41 and 42. These hinge members 41 and 42 are also rigidly affixed to the tongue member 12 by clamping apparatus consisting of plates 43 and bolts 44, but these members also could be affixed by other means such as by welding to the tongue member 12. The hinge members 41 and 42 are pivotally connected along a horizontal axis to a pair of levers 46 and 47, by the pins 48 and 49. The other ends of the levers 46 and 47 are pivotally connected to a safety member 50 by a pin 51. The other end of the safety member 50 has a clevis-like structure 52 disposed thereon, with a pair of aligned horizontal openings in the end thereof. Another clevis-like structure 53 has one end thereof with a horizontal opening therein, which end is disposed into the clevis 52 such that a pin 54 can be received through the clevis 52 and through the opening in the end 55 of the clevis-like structure 53. The other end of the clevis-like structure 53 has a pair of aligned vertical openings into which is received a nut and bolt assembly 56. It can be seen therefore that the pin 54 and the nut and bolt assembly 56 form a universal joint type of arrangement whereby pivoting is allowed about a vertical and a horizontal axis.

In operation, the pulling vehicle with the plate 11 and its attached mechanisms attached thereto would be backed up to the trailing vehicle, for example as shown in FIG. 6. The plate 27 and the clevis-like structure 53 would then be rotated to the position as shown in FIG. 6 by pushing the rod 21 to the left as shown in FIG. 5 and then pivoting this assembly, including the plate 27 and the clevis-like structure 53 to the position shown in FIG. 6. The pin 33 would then be inserted through the openings in the tongue flange members 31 and 32 and the plate 11, to thereby form a conventional trailer hitch structure as shown for example in FIGS. 1 and 3. With the rod 21 being then held to the left as shown in FIG. 5, the plate 21 and clevis-like structure 53 would then be pivoted downwardly into the position as shown in FIGS. 1 and 3, for example, and the pin 54 would then be inserted through the clevis 52 and the opening 55 so as to effectively couple the structure connected to the pulling vehicle, to the safety member 50.

The present invention is then completely and positively connected and the pulling vehicle can then pull the trailing vehicle about from place to place as required, without any adverse binding of the safety structure 10. This is true primarily because of the vertical pivot formed by the nut and bolt assembly 56 which is axially aligned with the pin 33 of the primary hitch. Also preventing any binding is the structure including the horizontal pivots along the pins 48, 51 and 54.

Figure 4:
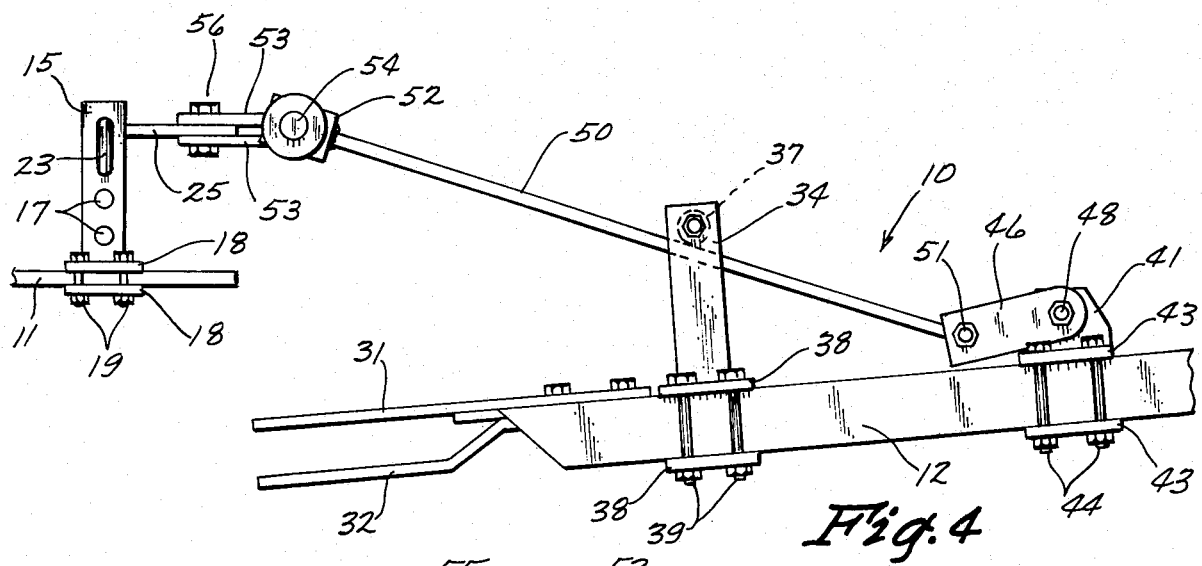
FIG. 4 is a side view of the present invention shown in a position whereby the primary hitch is not fastened and the safety device is in operation.
Figure 7:
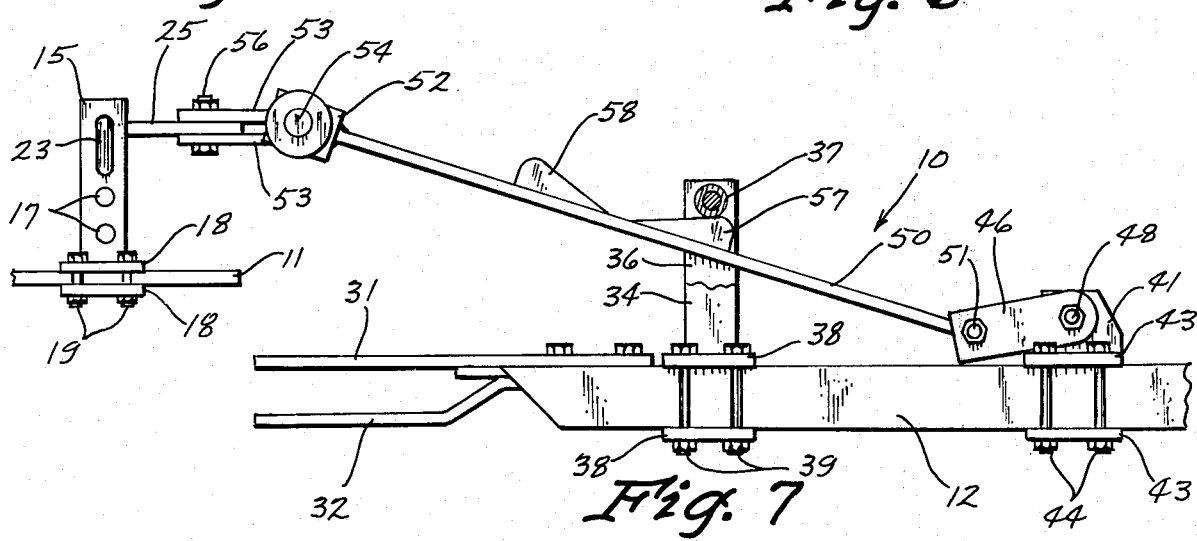
FIG. 7 is a view like FIG. 4, but showing a modified form of the invention having cam surfaces to keep a trailer tongue in a level position.

Should the primary hitch, however, become unfastened, such as having the pin 33 come out of the primary hitch, the safety member 50 and its associated structure will then serve to positively couple the tongue 12 to the pulling vehicle, as shown for example in FIGS. 4 and 7. Because of the abutment of the safety member 50 to the abutting rod 37 due to gravity, the tongue member 12 will be held off of the road surface. It can therefore be seen that this is a very valuable and important aspect of this invention, since if the tongue 12 was to dig into the road surface, control of the trailing vehicle by the pulling vehicle would be very difficult, if not impossible. Additionally, there is a substantially vertical pivot structure present along the nut and bolt mechanism 56, such that the trailer tongue member 12 can turn from side to side with respect to the pulling vehicle, a feature which is necessary for permitting the turning of corners and the like. The three horizontal pivots along the pins 48, 51 and 54 also serve to allow relative vertical movement between the pulling and trailing vehicles, which is necessary when irregular surfaces in the grade of the road are encountered. It is somewhat important also that the distance between the upstanding bars 34 and 36 be approximately the same distance apart as the width of the safety member 50 so as to prevent any wobbling of the safety bar 50 with respect to the tongue member 12.

It is furthermore noted that if the pin 33 is long enough, and the space between the tongue flange member 31 and the bottom of the nut and bolt device 56 is short enough, relative to the pin 33, this structure will actually prevent the pin 13 from being accidentally and inadvertently removed from the primary hitch.

In FIG. 7, the only difference in the structure of this embodiment is the addition of camming surfaces 57 and 58, which cooperate and abut the abutting bar 37. The purpose of these camming surfaces 57 and 58 is to aid in keeping the tongue member 12 off of the ground and achieving a more level position thereof. It can be seen, for example, that the camming surface 57 tends to level out the tongue member 12 if FIG. 7 is compared to the embodiment shown in FIG. 4. If the levers 46 and 47 are pivoted approximately 180° from the position as shown in FIG. 7, then the camming surface 58 will then abut the rod 37 and perform a similar camming function as performed by the camming surface 57.

It can therefore be seen that the disclosed invention accomplishes all of the objects noted above.

Obviously many modifications and variations of the present invention are possible in light of the above teachings. For example the safety apparatus of the present invention could be attached to the underside of the tongue member instead on one the top, with all other associated structures being moved accordingly. It is therefore to be understood that, within the scope of the appended claims, the invention may be practiced otherwise than as specifically described.

We claim:

1. A trailer hitch assembly comprising:
   a tongue member adapted to be connected to a trailing vehicle at one end thereof;
   means at the other end of said tongue member for attaching said tongue member to a pulling vehicle including means pivotally mounting said tongue member for pivoting along a vertical axis;
   lever means pivotally attached along a substantially horizontal axis to said tongue member;
   a safety member being pivotally connected along a second substantially horizontal axis to said lever means;
   means for attaching the other end of said safety means to the pulling vehicle, including a substantially vertical pivot and a substantially horizontal pivot, said vertical pivot lying substantially within the first said vertical axis; and
   abutment means connected to the tongue member for limiting the pivotal movement of the safety member with respect to the tongue member, said safety member lying between the abutment means and the tongue member.

2. A trailer hitch assembly as defined in claim 1 wherein said means for attaching the other end of the safety member to the pulling vehicle includes a plate having a vertical hole in one end thereof and two horizontally disposed openings disposed on the other end thereof;
   a fixed member adapted to be fixed with respect to the pulling vehicle and having at least two horizontally disposed holes therein;
   a rod rotatively and reciprocally extending through one of the horizontally disposed openings of the plate and one of the horizontally disposed holes of the fixed member, said rod having a semicircular portion on one end thereof;
   a part of said semicircular portion reciprocally extending into the other of the horizontally disposed holes of the fixed member and
   into the other of the openings in the plate whereby the plate may be selectively pivoted about the rod or fixed with respect to the rod.

3. A trailer hitch assembly as defined in claim 2 wherein said safety member has a camming means for abutment with the abutment means to thereby keep the tongue member in an elevated position.

* * * * *